(12) United States Patent  
Shuto et al.

(10) Patent No.: US 6,709,045 B2
(45) Date of Patent: Mar. 23, 2004

(54) VEHICLE BODY STRUCTURE

(75) Inventors: Hirotaka Shuto, Okazaki (JP); Hiroyuki Kurokawa, Nisshin (JP); Tatsuji Shimizu, Kariya (JP); Eisuke Okamoto, Kariya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/267,961

(22) Filed: Oct. 10, 2002

(65) Prior Publication Data

US 2003/0085593 A1 May 8, 2003

(30) Foreign Application Priority Data

Oct. 10, 2001 (JP) ........................................ 2001-312702

(51) Int. Cl.⁷ .................................................. B60J 7/50
(52) U.S. Cl. .................. 296/155; 296/203.03; 296/205; 296/30
(58) Field of Search ............................ 296/155, 203.03, 296/30, 205

(56) References Cited

U.S. PATENT DOCUMENTS 6,464,290 B2 * 10/2002 Schwarz et al. ....... 296/203.03
2002/0190544 A1 * 12/2002 Yamamoto et al. ......... 296/205

FOREIGN PATENT DOCUMENTS

JP 2001-10533 A 1/2001

* cited by examiner

Primary Examiner—Joseph D. Pape
(74) Attorney, Agent, or Firm—Birch, Stewart, Kolasch & Birch, LLP

(57) ABSTRACT

A roof side rail has a closed cross-section formed by integrating side rail outer and inner, and a part of the side rail forms an upper edge of a vehicle body side opening. A pipe-shaped reinforcing member is inserted into the side rail from the front side thereof to a part forming the upper edge of the opening, and is fixed to the side rail inner. Therefore, even when cross-sectional areas between the front side of the side rail and the part of the side rail forming the upper edge of the opening differ, both of which are connected to each other via a step part deviated to the largest degree, the stiffness of the step part is increased, and the number of parts and man-hours required for welding are reduced.

9 Claims, 5 Drawing Sheets

VEHICLE BODY STRUCTURE

CROSS REFERENCE TO RELATED APPLICATION

This non-provisional application incorporates by reference the subject matter of Application No. 2001-312702 filed in Japan on Oct. 10, 2001, on which a priority claim is based under 35 U.S.C. §119(a).

BACKGROUND OF THE INVENTION

1. Field of the Invention

The present invention relates to a vehicle body structure in which a roof side rail is comprised of a part at an upper edge of a vehicle body side opening, which is opened and closed by a sliding door, and a part at a front side thereof. In particular, the present invention relates to a vehicle body structure in which a roof side rail is comprised of a reinforcing member.

2. Description of Related art

To ensure durability and inhibit deformation when overload is applied to vehicles in collision, the vehicles are configured to maintain sufficient stiffness while enabling a reduction in weight. In particular, a front pillar of a vehicle and a roof side rail formed continuously from the front pillar are each formed to have a closed section to achieve a high stiffness in order to inhibit excessive deformation in frontal collision and offset collision. A reinforcing member is disposed inside the closed sections of the front pillar and the roof side rail, and they are integrated to inhibit deformation when overload is applied to the vehicle in collision. Prior art related to this technique is disclosed in Japanese Laid-Open Patent Publication No. 2001-10533.

As shown in FIG. 6, however, the foregoing prior art cannot easily be applied to a vehicle body structure in which a front opening 120 and a rear opening 130 partitioned by a center pillar 110 are formed in a vehicle body side 100, and the rear opening 130 is opened and closed by a sliding door, not shown as described below in detail.

As shown in FIGS. 6–9, a roof side rail 140 is opposed to respective upper edges of the front and rear openings 120 and 130, and has the front end thereof connected to a front pillar 150 and the rear end thereof connected to a rear pillar 160. The roof side rail 140 is formed with a space 180 at the center of its section in order to avoid interference with an arm having a roller provided in the sliding door, not shown, and a guide rail 170 intended to guide the roller. Thus, in the roof side rail 140, the sectional area of the closed section of a part opposed to the upper edge of the rear opening 130 is smaller than the sectional area of the closed section of a part opposed to the upper edge of the front opening 120, and the part opposed to the upper edge of the rear opening 130 is deviated toward the center of the vehicle body. Therefore, a step part D is formed in the vicinity of the upper side of the center pillar 110 that connects the front opening 120 and the rear opening 130 to each other.

As described above, in the vehicle body structure in which a rear door is a sliding door 200, the part of the roof side rail 140 opposed to the upper edge of the front opening 120 and the part of the roof side rail 140 opposed to the rear opening 130 are different in sectional form, and the front opening 120 and the rear opening 130 are connected to each other via the step part D as shown in FIGS. 7, 8, and 9. In this case, as shown in FIG. 6, an axis y2 (refer to an axial line L2) opposed to the upper edge of the rear opening 130 is greatly deviated from an axis of the part opposed to the upper edge of the front opening 120, i.e. an axis y1 (refer to an axial line L1) corresponding to the center of the stiffness at which a compression force and a tensile force are balanced to offset each other in the direction of the section (indicated by δ in FIGS. 6 and 9).

Therefore, when overload is applied to the roof side rail in the axial direction in frontal collision or offset collision, the step part D deviated to the largest degree is most likely to be affected by a bending action, and the roof side rail is easily bent from the step part D.

SUMMARY OF THE INVENTION

In view of the above, it would therefore be desirable to provide a vehicle body structure which is capable of improving the stiffness of a roof side rail, along which is disposed a guide rail that guides a sliding door.

Further, according to the present invention, the vehicle body structure using the sliding door increases stiffness by improving the sectional coefficient of a roof side rail by a pipe-shaped reinforcing member.

To attain the above object, in the present invention, a reinforcing member is disposed in the cross section of the roof side rail and has a closed section such that a cross-sectional area of a part proximal to the rail member is different from a cross-sectional area of other part.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein.

DETAILED DESCRIPTION OF THE PREFERRED EMBODIMENTS

The present invention will now be described in detail with reference to the accompanying drawings showing a preferred embodiment thereof.

Figure 2:
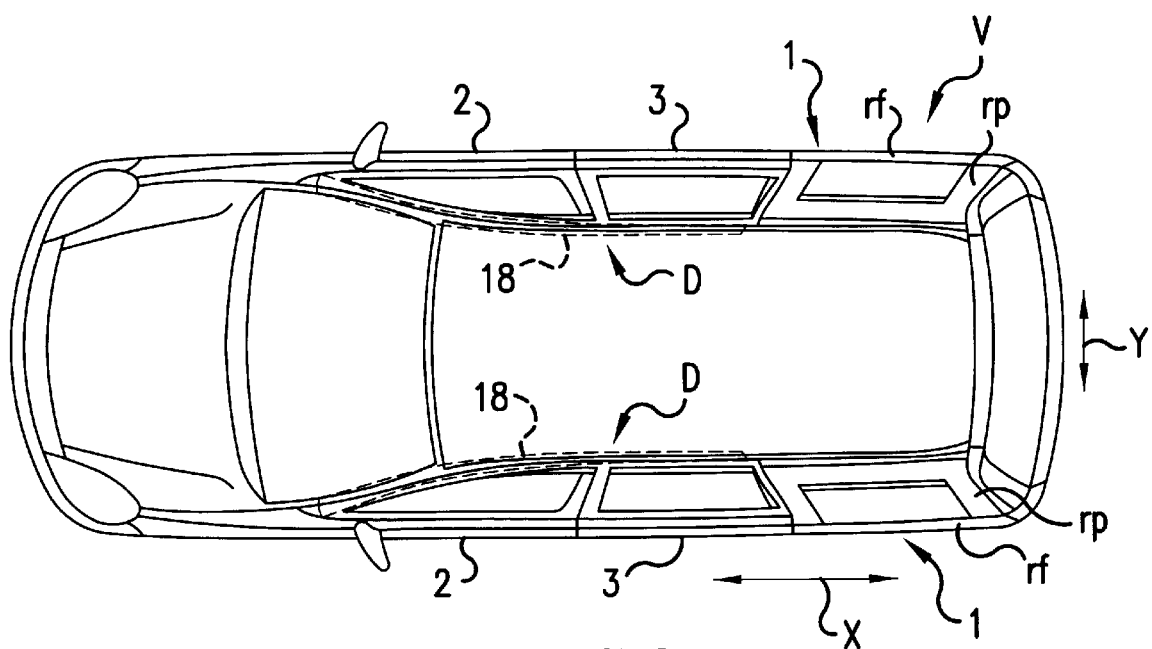
FIG. 2 is a schematic plan view showing the vehicle having the vehicle body structure of FIG. 1.

A vehicle body structure according to the present invention is applied to a vehicle body side of a vehicle V shown in FIG. 2. The vehicle body side of the vehicle V is comprised of a side base 1 in which essential parts except for a vehicle body front part are integrated together. The side base 1 is molded by pressing, and a plurality of vehicle body component parts described later are welded to proper locations of the side base 1 to improve the stiffness thereof.

A front opening 4 and a rear opening 5, which are opened and closed by a front door 2 and a rear door (sliding door) 3, respectively (refer to FIGS. 1 and 2), are formed at the center of the side base 1, and the front opening 4 and the rear opening 5 are partitioned by a center pillar 6. Outer members 7a and 8a of a front pillar upper 7 and a front pillar lower 8, respectively corresponding to the front edge of the front opening 4, are formed at the front end of the side base 1, and outer members 9a and 10a of a C pillar upper and a C pillar lower corresponding to the rear edge of the rear opening 5 are formed at the rear of the rear opening 5. Further, in the side base 1, a rear fender upper 11a and outer members 12a and 13a of a rear pillar upper and a rear pillar lower, respectively, are formed continuously from the outer member 10a of the C pillar lower. Further, in the side base 1, an outer member 14a of a roof side rail 14 is formed continuously upward from the front and rear openings 4 and 5 and the rear fender upper 11a, and an outer member 15a of a side sill is formed at respective lower edges of the front and rear openings 4 and 5. It should be noted that in the side base 1, the outer members 14a and 7a of the roof side rail 14 and the front pillar upper 7, respectively are formed continuously from each other.

Inner members 7b, 8b of the front pillar upper and lower are laid on the outer members 7a, 8a of the front pillar upper and lower, and end flanges of the outer members 7a, 8a and the inner members 7b, 8b are welded together to form a front pillar Pa having a closed cross-sectional form.

An inner member 14b extending in a longitudinal direction X of the vehicle body is laid on the outer member 14a of the roof side rail 14, and end flanges of the outer member 14a and the inner member 14b are welded together to form the roof side rail 14 having a closed cross-sectional form.

An inner member 15b extending in the longitudinal direction X of the vehicle body is laid on the outer member 15a of the side sill 15, and end flanges of the outer member 15a and the inner member 15b are welded together to form the side sill 15 having a closed cross-sectional form.

Inner members, not shown, are laid on the rear fender upper 11a and the outer members 12a, 13a of the rear pillar upper and lower, and end flanges thereof are welded together to form a rear fender rf and a rear pillar rp each having a closed cross-sectional form (refer to FIG. 2).

Figure 1:
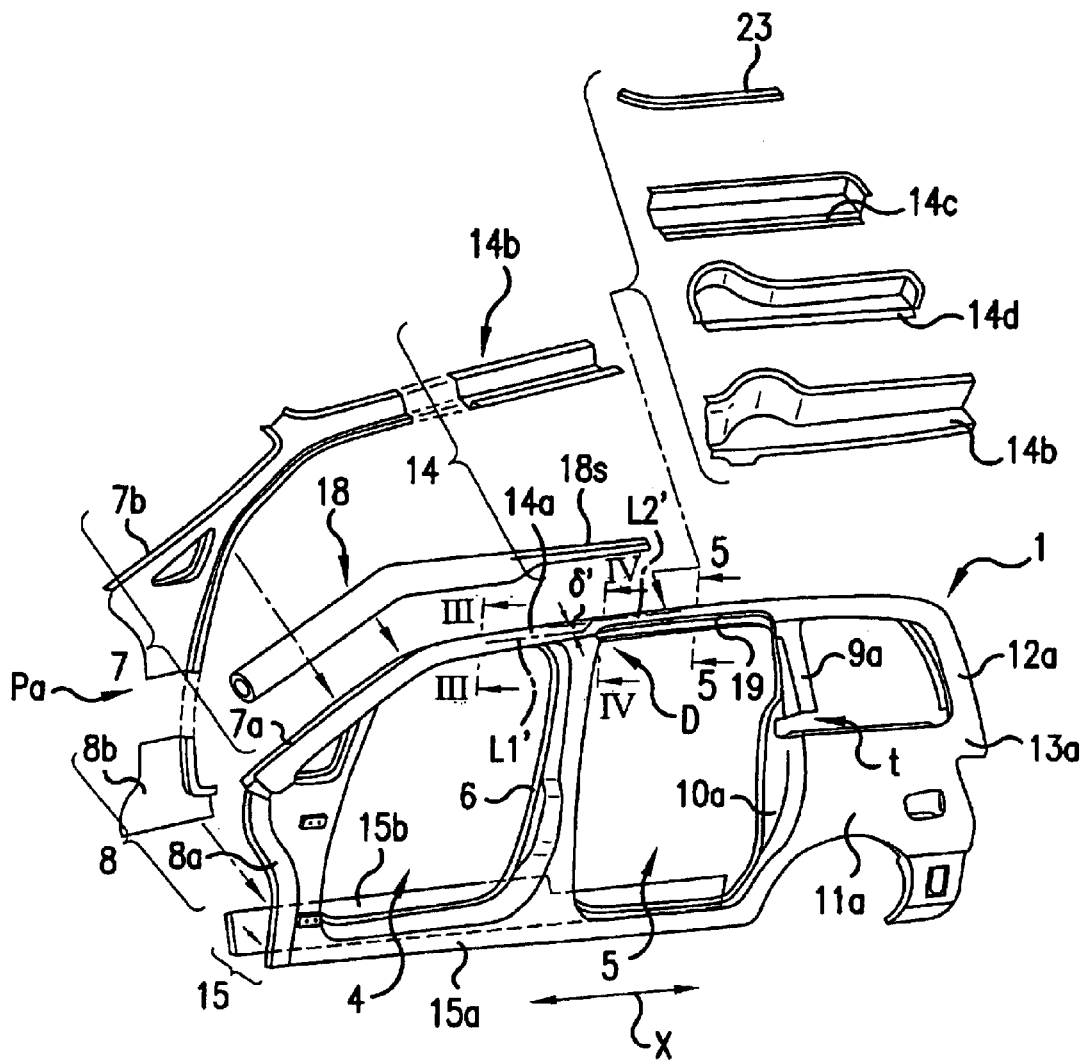
FIG. 1 is an exploded perspective view showing a side base and a connecting member of a vehicle having a vehicle body structure according to an embodiment of the present invention.
Figure 3:
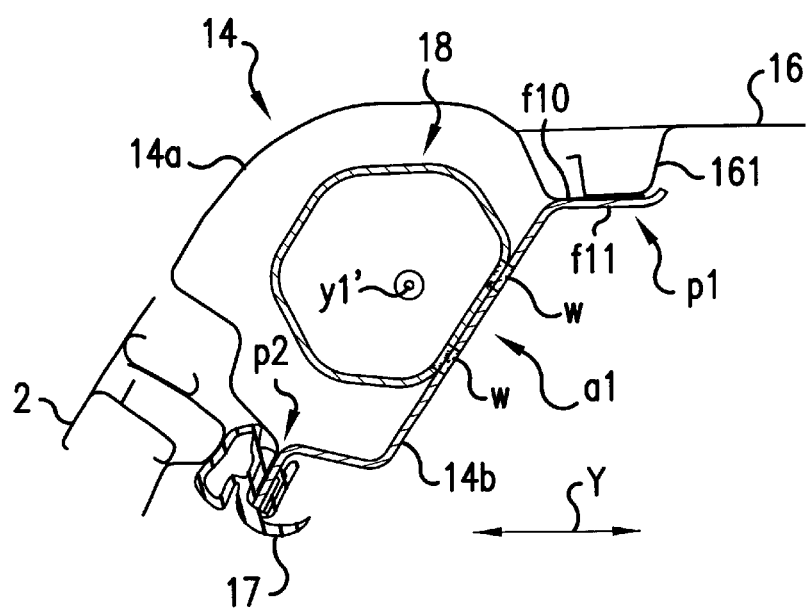
FIG. 3 is an enlarged cross-sectional view taken along line III—III of FIG. 1.

The front end of the roof side rail 14, which has the same shape as the rear end of the front pillar upper 7, has a closed cross-sectional form. As shown in FIGS. 1 and 3, flanges f10, f11 of the roof side rail outer 14a and the inner member (roof side inner) 14b, which are disposed inside the vehicle, are laid on each other. A bending edge 161 of the side end of a roof 16 is laid on the flange f10, and the bending edge 161 and the flanges f10, f11 are welded together to form a flange overlap section p1. The upper part of the flange overlap section p1 is covered with an elastic seal member, not shown, to ensure preferable appearance.

Flanges of the outer member (roof side rail outer) 14a and the inner member (roof side rail inner) 14b, which are disposed at the side of the vehicle, are laid on each other to form a flange overlap section p2, which is covered with a seal rubber 17. When the front door 2 is closed, the seal rubber 17, covering the flange overlap section p2, is pressed to be brought into contact with an upper sash of the front door 2 to seal a vehicle compartment (a right-side area in FIG. 3)

A principal part a1 of the roof side rail 14 is constructed such that a pipe-shaped reinforcing member 18 is inserted into a closed cross-sectional space and the pipe-shaped reinforcing member 18 and the roof side rail inner 14b are sequentially and intermittently welded together at a plurality of positions (indicated by w in FIG. 3) in the longitudinal direction to integrate together the pipe-shaped reinforcing member 18 and the roof side rail inner 14b.

By hydro-foam molding, the pipe-shaped reinforcing member 18 is formed such that the cross-sectional area thereof varies at different positions in the longitudinal direction. The pipe-shaped reinforcing member 18 is disposed continuously from the front pillar upper 7 to the principal part of the roof side rail 14. In particular, the pipe-shaped reinforcing member 18 is formed to have a relatively large diameter in a section from the front pillar upper 7 to the front side of the roof side rail 14, and this ensures the sufficient stiffness of the front pillar upper and the roof side rail 14, and more particularly, the bending stiffness of the front pillar upper and the roof side rail 14.

Figure 4:
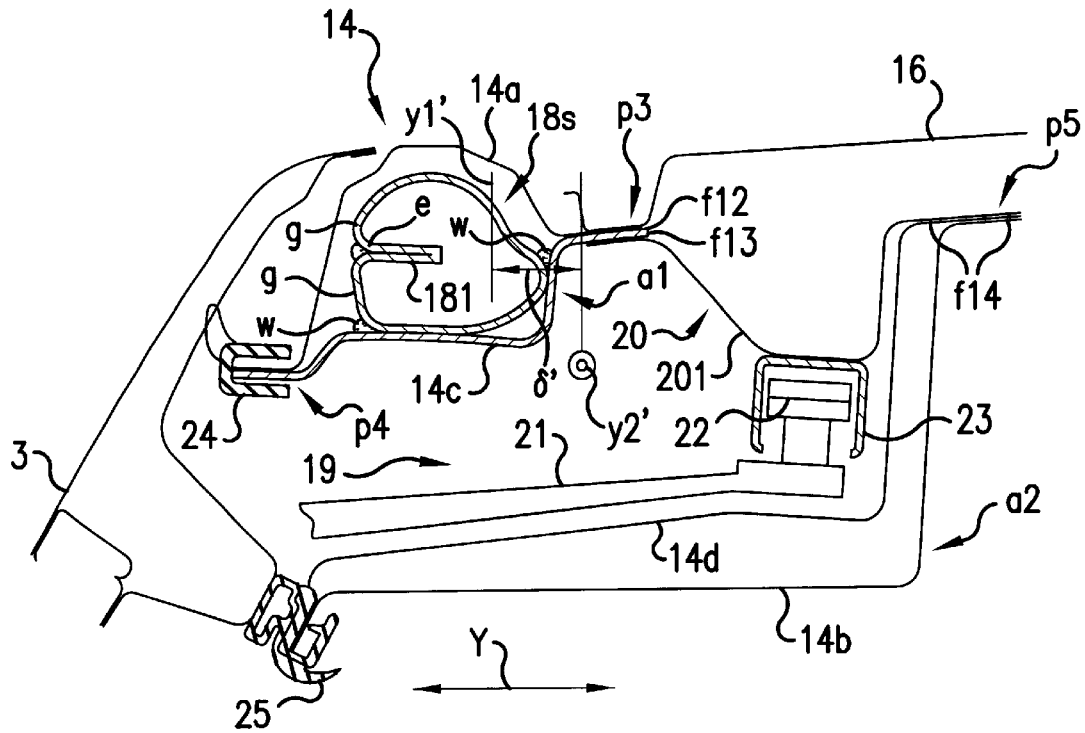
FIG. 4 is an enlarged cross-sectional view taken along line IV—IV of FIG. 1.

As shown in FIGS. 1 and 4, the roof side rail 14 has the step part D at the rear of a location where the roof side rail 14 is joined to the upper end of the center pillar 6. In the step part D of the roof side rail 14, the roof side outer panel 14a and the roof side inner panel 14b are disposed relatively far away from each other, and the principal part a1, space 19, and auxiliary part a2 are formed between the roof side outer panel 14a and the roof side inner panel 14b.

The principal part a1 of the roof side rail 14 is constructed such that the closed cross-section formed by integrating together the roof side outer panel 14a and a roof side rail extension upper 14c is relatively small in the direction of the vehicle width and in the vertical direction, and a diameter reduced part 18s of the pipe-shaped reinforcing member 18 is inserted into the closed cross-sectional space, and the diameter reduced part 18s and the roof side rail extension upper 14c are intermittently and sequentially welded to each other at a plurality of positions (indicated by w) in the longitudinal direction to integrate together the pipe-shaped reinforcing member 18 and the principal part a1 of the roof side rail 14.

It should be noted that in the principal part a1, the roof 16 and a roof inner panel 20 are laid on the upper and lower sides of flanges f12, f13 of the roof side outer panel 14a and the roof side rail extension upper 14c, which are disposed inside the vehicle, and they are welded together to form a quadruple overlap section p3.

A double overlap section p4 at the side of the vehicle body, where the roof side outer panel 14a and the roof side rail extension upper 14c are laid on each other, is covered with a seal rubber 24, and when the sliding door 3 is closed, the seal rubber 24 is pressed to be brought into contact with the sliding door 3 to seal the vehicle compartment.

The diameter reduced part 18s of the pipe-shaped reinforcing member 18 is reduced in diameter by forming an internal projection 181 projecting inward in the section of the diameter reducing part 18s. Further, an outer peripheral side base part e of the internal projection 181 is opposed to the side of the vehicle (the left side in FIG. 4), and the internal projection 181 is shaped like an extending plate that extends from the outer peripheral side base part e inward in the diameter reduced part 18s. The outer peripheral side base part e is welded. Thus, at a location where the portion of the roof side rail 14, opposed to the upper edge of the rear opening 5 (i.e. the upper edge portion), is continuously formed from the step part D of the roof side rail 14, the diameter reduced part 18s of the pipe-shaped reinforcing member 18 is reduced in diameter by the outer peripheral side base part e thereof closer to the side of the vehicle, and the internal projection 181 thereof laterally extending inward in the diameter reduced part 18s. Pieces g are respectively formed at the upper and lower sides of the outer peripheral side base part e. Thus, the diameter reduced part 18s as a whole has a sectional form like a heart which is turned sideways.

The diameter reduced part 18s of the pipe-shaped reinforcing member 18 having the sectional form like the heart turned sideways is reduced in diameter at a sufficiently high diameter-reducing rate by forming the internal projection 181 shaped like an extending plate in the diameter reduced part 18s. Specifically, in the case where the pipe-shaped reinforcing member 18 is formed to have different sectional areas at respective positions in the longitudinal direction by hydro-foam molding, the diameter enlarging rate is about 5 to 10% in the case of the normal hydro-foam molding.

However, in this embodiment, a pipe-shaped material with a relatively large diameter, not shown, is prepared in advance, and a part of the pipe-shaped material is reduced in diameter and is then increased in diameter by hydro-foam molding. In the diameter reducing process, the internal projection 181, which projects inward in the section of the diameter reducing part 18s, is concaved by pressing and reduced in diameter to ensure a high diameter-reducing rate. The entire pipe-shaped material is fitted into a predetermined pattern, clamped, and is subjected to the normal hydro-foam molding in which the diameter enlarging rate is about 5 to 10%. On this occasion, the part concaved by pressing is formed into the plate-shaped internal projection.

Thereafter, the outer peripheral side base part e in the diameter reducing part 18s of the pipe-shaped reinforcing member 18, which is obtained by opening the pattern, is welded, so that the pipe-shaped reinforcing member 18 is completed as a product. Consequently, the pipe-shaped reinforcing member 18 is machined with the same effects as in the case where it is formed at a substantially high diameter-enlarging rate.

In the case where the pipe-shaped reinforcing member 18 is used as a reinforcing member, it is inserted into the front pillar 7 and the roof side rail 18 sequentially. This reduces the number of parts, the man-hours required for welding, and the costs.

The space 19 below the principal part a1 is formed in the side of the roof side rail 14, which extends toward the side of the vehicle, and the deepest part of the space 19, closer to the center of the vehicle body, is formed with a downward bulging part 201 of the roof inner panel 20. A slide door rail 23 is mounted on the downward bulging part 201, and is tilted with respect to the longitudinal direction X. The upper end of the sliding door 3 is slidably connected to the sliding door rail 23 via an arm 21 having a roller.

The space 19 is formed as a relatively large space so as to avoid interference with the arm 21 having the roller and the sliding door rail 23, and therefore, the sectional area of the principal part a1 is relatively small.

The auxiliary part a2 is disposed below the principal part a1 across the space 19. The auxiliary part a2 is constructed such that the roof side inner panel 14b and a roof side rail extension lower 14d are laid on each other to form a reverse L-shaped cross-section and integrally form a flange portion p5 positioned inside the vehicle. Both flanges f14 of the flange portion p5 are welded to the inner side of the downward bulging section 201 of the roof inner panel 20.

A double overlap section p6, which is formed by the roof side rail extension lower 14d and the roof side rail inner panel 14b and is disposed outside the vehicle, is covered with a seal rubber 25, and when the sliding door is closed, the seal rubber 25 is pressed to be brought into contact with the sliding door to seal the vehicle compartment.

Figure 5:
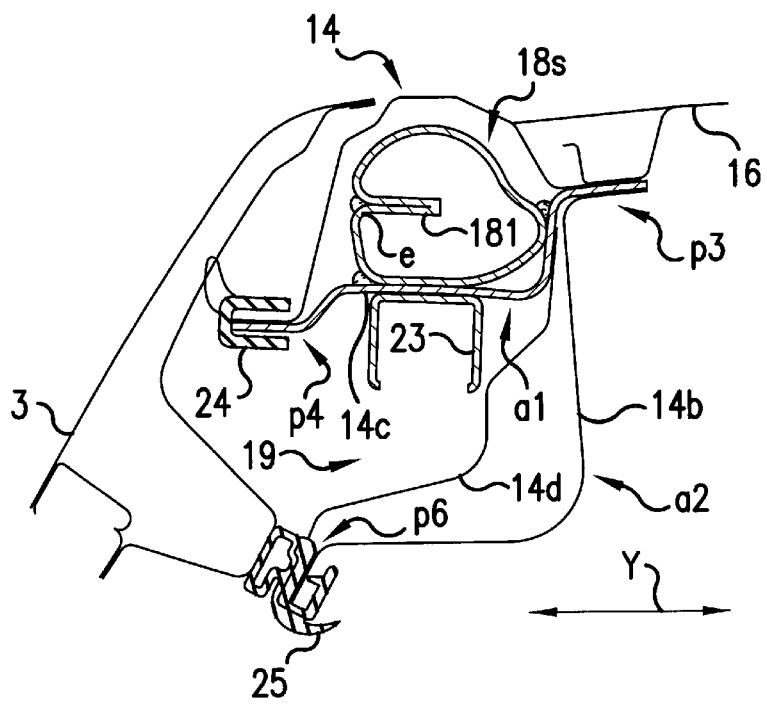
FIG. 5 is an enlarged cross-sectional view taken along line V—V of FIG. 1.
Figure 6:
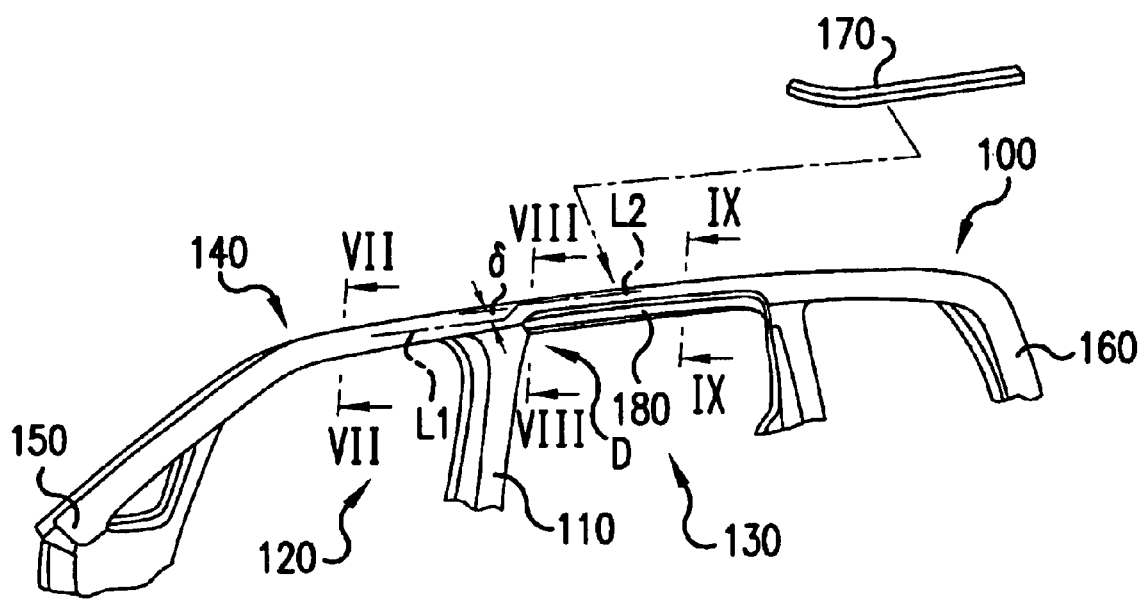
FIG. 6 is an exploded perspective view showing a side base and a connecting member of a vehicle having a vehicle body structure according to prior art.
Figure 7:
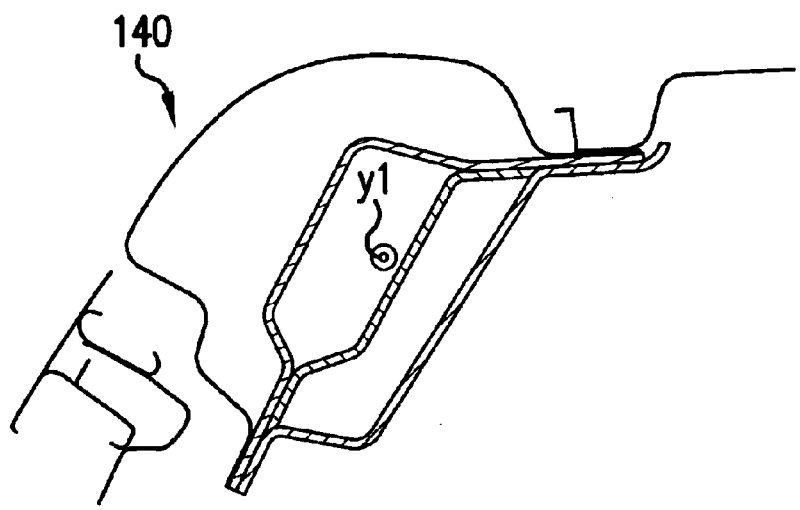
FIG. 7 is an enlarged cross-sectional view taken along line VII—VII of FIG. 6.
Figure 8:
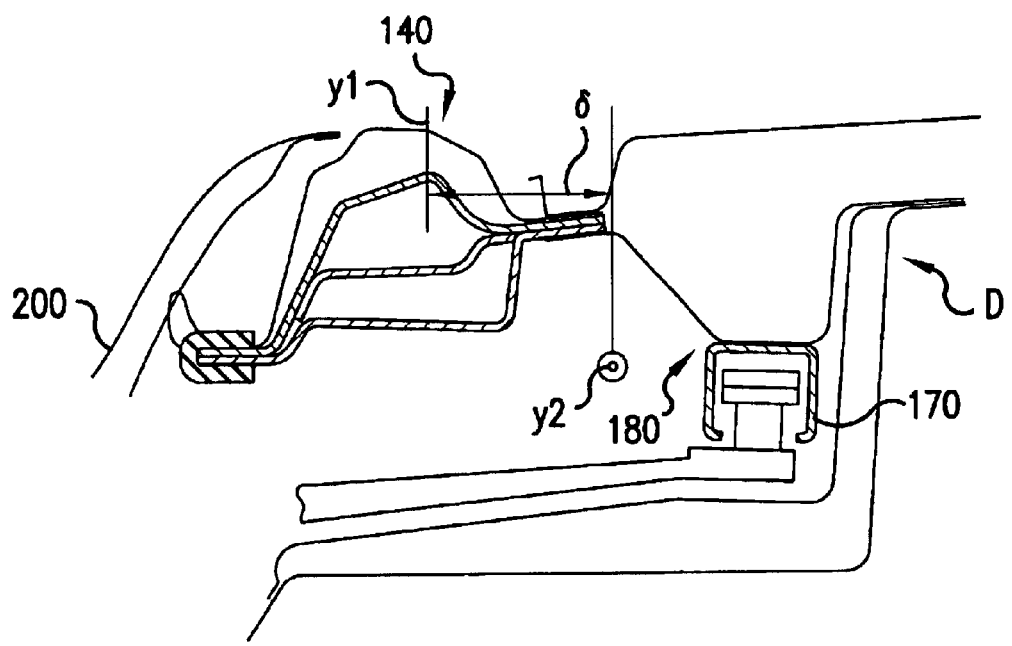
FIG. 8 is an enlarged cross-sectional view taken along line VIII—VIII of FIG. 6.
Figure 9:
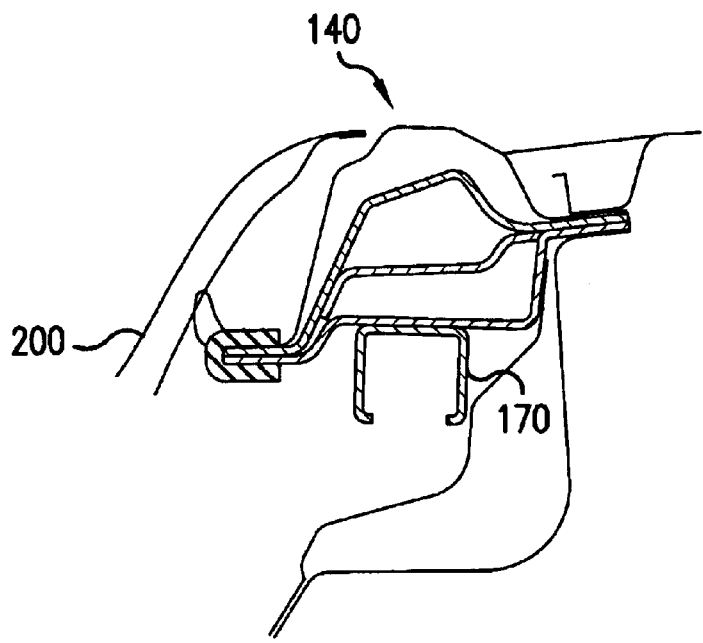
FIG. 9 is an enlarged cross-sectional view taken along line IX—IX of FIG. 6.

As shown in FIGS. 1 and 5, the intermediate part of the roof side rail 14 is comprised of a principal part a1, space 19, and auxiliary part a2 as is the case with the step part D. The principal part a1 has the same shape as that of the step part D, and is different from the step part D only in that slide door rail 23 is joined to the lower side of the roof side rail extension upper 14c, and the width of the auxiliary part a2 in the direction of the vehicle width is relatively short. The structure of the diameter reduced part 18s of the principal part a1 is identical with that of the step part D.

In the step part D, the slide door rail 23 is greatly curved toward the center of the vehicle body in the longitudinal direction X, and in the intermediate part, the slide door rail 23 is displaced toward the side of the vehicle. This enables the slide door 3 to be fitted into the rear opening 5 when closed, and slide rearward after being displaced in a direction away from the rear end of the vehicle without interfering with the side base 1 when sliding rearward after being opened.

It should be noted that an intermediate slide door rail, not shown, is mounted in parallel with the slide door rail 23 in the intermediate part of an outside wall (denoted by t in FIG. 1) of the side base 1, and a roller at an end of a sliding bar, not shown, extending inward from the intermediate part in the vertical direction of the sliding door 3 is fitted into the intermediate slide door rail. This enables the sliding door 3 to be guided on the slide door rail 23 and the intermediate slide door rail to easily open and close the rear opening 5 and slide forward and backward without interfering with the side base 1.

As is the case with the front end of the roof side rail 14, the rear part of the roof side rail 14 is constructed such that the roof side rail outer 14a and the roof side rail inner 14b are laid on each other to form a closed cross-section, and the rear end of the roof side rail 14 is formed continuously to the side of the outer member 12a of the rear pillar upper outer. It should be noted that overload applied in collision is diffused throughout in the longitudinal direction by the roof side rail 14 and the pipe-shaped reinforcing member 18 disposed therein. Since the pipe-shaped reinforcing member 18 is not required to extend out to the rear part of the roof side rail 14, the rear part of the pipe-shaped reinforcing member 18 is out of the closed section of the rear part of the roof side rail 14. However, depending upon the circumstances, the pipe-shaped reinforcing member 18 may be extended out to the rear part of the roof side rail 14.

Suppose that overload is applied from the front pillar Pa to the roof side rail 14 of the vehicle having the above described vehicle body structure in a frontal collision or offset collision.

In this case, the front side of the roof side rail 14 and the part of the roof side rail 14 corresponding to the upper edge of the rear opening 5 at the rear of the step part D are greatly different in sectional area. In particular, an axis of the section formed by the principal part a1, space 19, and auxiliary part a2, forming the part corresponding to the upper edge of the rear opening 5, that is, an axis y2' corresponding to the center of the stiffness (where the compression force and the tensile force in the direction of the section are balanced to offset each other) (refer to an axial line L2'), is deviated from an axis y1' at the front side corresponding to the upper edge of the front opening 4 (refer to an axial line L1') toward the center of the vehicle body by δ, and therefore, the step part D is deviated to the largest degree.

In this case, however, the front pillar Pa and the front end of the roof side rail 14 are sufficiently reinforced by the front side of the pipe-shaped reinforcing member 18, which has a relatively large diameter, and the step part D and the intermediate part of the roof side rail 14 are sufficiently reinforced by the diameter reduced part 18s of the pipe-shaped reinforcing member 18. Thus, the overload is sequentially diffused in the front pillar Pa, the front end of the roof side rail 14, and the step part D and the middle part of the roof side rail 14 to inhibit the roof side rail 14 from being locally deformed by bending.

In particular, the pipe-shaped reinforcing member 18 inhibits the step part D from bending. Specifically, the pipe-shaped reinforcing member 18 has the heart-shaped cross-section from the step part to the intermediate part thereof, and the internal projection 181 with the outer peripheral side base part e thereof positioned close to the side of the vehicle is disposed to extend laterally toward the inner side of the vehicle. Therefore, the internal projection 181 sufficiently improves the stiffness of the diameter reduced part 18s. Further, since the outer peripheral side base part e of the internal projection 181 in the diameter reduced part 18s is welded, the axis of the diameter reduced part 18s is relatively deviated toward the outer peripheral side base part e close to the side of the vehicle. Thus, in the step part D, the pipe-shaped reinforcing member 18 itself controls the degree of deviation δ between the axis of the front end and the axis of the middle part to a relatively small value.

Therefore, the pipe-shaped reinforcing member 18 itself ensures the high stiffness of the step part D. Further, even if the step part D and the middle part of the roof side rail 14 start buckling or bending, the step part D has a high capability to withstand buckling or bending since the internal projection 181 in the diameter reduced part 18s of the pipe-shaped reinforcing member 18 ensures the high stiffness of the pipe-shaped reinforcing member 18 and the axis of the pipe-shaped reinforcing member 18 is deviated toward the center of the vehicle body to a relatively small degree. Further, the stiffness of the roof side rail 14 is increased by welding the outer peripheral side base part e, and this surely inhibits the step part D and the intermediate part of the roof side rail 14 from being displaced by buckling.

Therefore, in the vehicle body structure of the vehicle having the sliding door in which stress is easily concentrated at some positions in terms of the structure in frontal collision or offset collision, the degree of deviation δ' of the axis at the front and rear parts of the step part D in the vicinity of a joint between the roof side rail 14 and the center pillar 6 is reduced, and the sectional characteristics are improved to effectively reinforce the roof side rail 14.

Further, the present invention can solve the problem that the number of plates stacked in flange portions and the man-hours required for welding is increased as in the case where the conventional vehicle body structure is adapted in which a reinforcing member is comprised of stacked reinforcement members. It is therefore possible to reduce the number of parts, reduce the man-hours required for welding, and raise the productivity by improvement in the assembling efficiency.

Although, in the above described vehicle body structure in which the side base 1 opens and closes the front and rear openings by the front door and the sliding door, the present invention should not be limited to this. For example, a vehicle body structure, in which a single opening is formed in a side base, not shown, and is opened and closed by a sliding door, would achieve the same effects as the vehicle body structure shown in FIG. 1.

What is claimed is:

1. A vehicle body structure, comprising:
    a roof side rail having a closed section formed by integrating an outer panel member and an inner panel member to form a side edge of a roof member of a vehicle body;
    a rail member disposed at an upper edge of a side opening of the vehicle body and along said roof side rail, and guiding a sliding door that opens and closes the side opening; and
    a reinforcing member made of a single piece material and disposed in the closed section of said roof side rail, the reinforcing member having a closed section such that a cross-sectional area of a part proximal to the rail member is different from a cross-sectional area of a part other than the part proximal to the rail member.

2. A vehicle body structure according to claim 1, wherein a front pillar has a closed section formed by integrating a pillar inner panel and a pillar outer panel is connected to a front end of said roof side rail, and said reinforcing member extends from the closed section of the front pillar and is fixed inside the closed section of the front pillar.

3. A vehicle body structure according to claim 1, wherein the closed section of said roof side rail is formed such that a sectional area of a part along which said rail member is disposed is smaller than a sectional area of a part close to the front pillar, and said reinforcing member is formed such that said cross-sectional area of the part proximal to said rail member is smaller than a cross-sectional area of the part closer to the front pillar.

4. A vehicle body structure according to claim 2, wherein the closed section of said roof side rail is formed such that a cross-sectional area of a part along which said rail member is disposed is smaller than a cross-sectional area of a part close to the front pillar, and said reinforcing member is formed such that said cross sectional area of the part proximal to said rail member is smaller than a sectional area of the part closer to the front pillar.

5. A vehicle body structure according to claim 3, wherein, in the part proximal to said rail member, said reinforcing member is formed with an internal projection projecting inward therein.

6. A vehicle body structure according to claim 5, wherein an outer peripheral side base part of the internal projection is formed to extend toward an inner side of the vehicle body from a side of the vehicle body.

7. A vehicle body structure, comprising:
    a roof side rail having a closed section formed by integrating an outer panel member and an inner panel member;
    a front pillar provided continuously from a front end of said roof side rail, and having a closed section formed by integrating a pillar inner panel and a pillar outer panel;
    a center pillar extending downward from an intermediate section of said roof side rail;
    a sliding door that opens and closes a vehicle body side opening with an upper edge thereof formed by a part of said roof side rail at rear of said center pillar, and a part of a side edge thereof formed by said center pillar;

a sliding door rail member that extends along the upper edge to a position in a vicinity of the upper edge to guide said sliding door; and a pipe-shaped reinforcing member disposed inside the closed section of said roof side rail and being continuously formed from said front pillar to the part of said roof side rail forming the upper edge of the side opening and fixed to the pillar inner panel and the roof side inner panel by welding, wherein the closed section of said roof side rail is formed such that a cross-sectional area of the part forming the upper edge is smaller than a cross-sectional area of a part in front of said center pillar; and wherein said reinforcing member is formed such that a cross-sectional area of a part disposed at the upper edge of the sliding door is smaller than a cross-sectional area of a part disposed in front of said center pillar.

8. A vehicle body structure according to claim 7, wherein the part of said pipe-shaped reinforcing member disposed at the upper edge of said sliding door projects inward in said pipe-shape reinforcing member to extend from an outer peripheral side base part, disposed close to a side of the vehicle body, toward an inner side of the vehicle body.

9. A vehicle body structure, comprising:

a roof side rail having a closed section disposed at an upper part of a side opening of a vehicle body;

a rail member disposed along said roof side rail, and guiding an arm of a sliding door that opens and closes the side opening; and a reinforcing member made of a single piece material and disposed in the closed section of said roof side rail, the reinforcing member having a closed cross-section such that a cross-sectional area of a part above a space where the arm of the sliding door moves is different from a cross-sectional area of a part disposed in front of the space.

* * * * *